(12) United States Patent
Liu et al.

(10) Patent No.: US 9,047,022 B2
(45) Date of Patent: *Jun. 2, 2015

(54) METHOD AND APPARATUS FOR A PRINT SPOOLER TO CONTROL DOCUMENT AND WORKFLOW TRANSFER

(71) Applicant: RICOH CO., LTD., Tokyo (JP)

(72) Inventors: Xu Liu, Cupertino, CA (US); Michael Gormish, Cupertino, CA (US)

(73) Assignee: RICOH CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/043,471

(22) Filed: Oct. 1, 2013

(65) Prior Publication Data

US 2014/0126014 A1    May 8, 2014

Related U.S. Application Data

(63) Continuation of application No. 12/720,816, filed on Mar. 10, 2010, now Pat. No. 8,547,576.

(51) Int. Cl.
    *G06F 3/12*       (2006.01)
    *G06Q 10/06*      (2012.01)
    *H04N 1/40*       (2006.01)

(52) U.S. Cl.
    CPC ............. *G06F 3/12* (2013.01); *G06F 3/1204* (2013.01); *G06F 3/1247* (2013.01); *G06F 3/1275* (2013.01); *G06F 3/1288* (2013.01); *G06Q 10/06* (2013.01); *G06Q 10/0633* (2013.01)

(58) Field of Classification Search
    CPC ... G06F 3/1204; G06F 3/1246; G06F 3/1288; G06F 3/1296; G06Q 10/06; G06Q 10/0633
    USPC ............... 358/1.1, 1.9, 1.13, 1.14, 1.15, 1.18; 705/7.27, 8; 382/128
    See application file for complete search history.

(56) References Cited

U.S. PATENT DOCUMENTS

| | | |
|---|---|---|
| 7,084,992 B1 | 8/2006 | Amarger et al. |
| 7,177,488 B2 | 2/2007 | Berkner et al. |

(Continued)

FOREIGN PATENT DOCUMENTS

| | | |
|---|---|---|
| EP | 1912165 A2 | 10/2007 |
| GB | 2383456 A | 6/2003 |

(Continued)

OTHER PUBLICATIONS

CN Application No. 201110057332.X, Office Action, Dated May 9, 2013, 14 pages.

(Continued)

*Primary Examiner* — Gabriel Garcia
(74) *Attorney, Agent, or Firm* — Blakely, Sokoloff, Taylor & Zafman LLP

(57) ABSTRACT

A method and apparatus for a print spooler to control document and workflow transfer are described. In one embodiment, the method comprises receiving a request to print an electronic document from a print driver. The method may also comprise retrieving a workflow configuration utilizing a workflow print spooler, where the workflow print spooler provides pre-configured workflow configuration data for a corresponding workflow. In one embodiment, the method further comprises deploying the electronic document into the workflow based on the workflow configuration data.

20 Claims, 12 Drawing Sheets

(56) References Cited

U.S. PATENT DOCUMENTS

| | | |
|---|---|---|
| 7,337,392 B2 | 2/2008 | Lue |
| 7,451,191 B2 | 11/2008 | Kundu et al. |
| 7,516,402 B2 | 4/2009 | Koivisto et al. |
| 7,545,523 B2 | 6/2009 | Schmidt et al. |
| 7,567,518 B2 | 7/2009 | Fitzgerald |
| 7,574,496 B2 | 8/2009 | McCrory et al. |
| 7,603,620 B2 | 10/2009 | Erol et al. |
| 7,773,242 B2 | 8/2010 | Morales |
| 7,961,342 B2 | 6/2011 | Morales |
| 8,140,373 B2 | 3/2012 | Aron et al. |
| 8,373,878 B2 | 2/2013 | Kato |
| 8,547,576 B2 * | 10/2013 | Liu et al. ............ 358/1.15 |
| 8,601,478 B2 | 12/2013 | Yoshida |
| 2003/0234950 A1 | 12/2003 | Lay |
| 2004/0059995 A1 | 3/2004 | Takabayashi et al. |
| 2006/0136491 A1 | 6/2006 | Berkner et al. |
| 2006/0288015 A1 | 12/2006 | Schirripa et al. |
| 2007/0121147 A1 | 5/2007 | Corona et al. |
| 2008/0212113 A1 | 9/2008 | Kim |
| 2008/0311936 A1 | 12/2008 | Lovell, Jr. |
| 2009/0086239 A1 | 4/2009 | Selvaraj |
| 2009/0109468 A1 | 4/2009 | Barclay et al. |
| 2009/0113291 A1 | 4/2009 | Barclay et al. |
| 2009/0276266 A1 | 11/2009 | Nishiyama |
| 2010/0231968 A1 | 9/2010 | Hirasawa et al. |
| 2010/0265544 A1 | 10/2010 | Anezaki et al. |
| 2011/0242581 A1 | 10/2011 | Lee |

FOREIGN PATENT DOCUMENTS

| | | |
|---|---|---|
| WO | WO 01/90928 | 11/2001 |
| WO | WO 2008/121590 | 10/2008 |

OTHER PUBLICATIONS

EP Application No. 11154598, European Search Report, Dated Apr. 4, 2013, 6 pages.

JP Publication No. 03-020818, Patent Abstract, Publication date Jan. 29, 1991, 1 page.

* cited by examiner

METHOD AND APPARATUS FOR A PRINT SPOOLER TO CONTROL DOCUMENT AND WORKFLOW TRANSFER

PRIORITY

This is a continuation of U.S. patent application Ser. No. 12/720,816, filed on Mar. 10, 2010, now U.S. Pat. No. 8,547,576, issued Oct. 1, 2013, entitled "Method and Apparatus for a Print Spooler to Control Document and Workflow Transfer," which is assigned to the corporate assignee of the present invention.

RELATED APPLICATIONS

This application is related to the co-pending applications entitled "METHOD AND APPARATUS FOR A PRINT DRIVER TO CONTROL DOCUMENT AND WORKFLOW TRANSFER" concurrently filed on Mar. 10, 2010, U.S. patent application Ser. No. 12/720,811.

FIELD OF THE INVENTION

The present invention relates to the field of workflow management; more particularly, the present invention relates to a system and method for facilitating document and workflow transfer to and from different electronic devices.

BACKGROUND OF THE INVENTION

Total paper volume is decreasing as offices "go green" and paperless, replacing traditional paper media with digital media. At the same time, use of cloud computing/services is on the rise. Powered by the computational power in the "cloud", handheld devices which interact with clouds are penetrating into every corner of business and personal lives. There are a number of electronic E-paper devices from different manufacturers deployed in today's business offices. As a result, today's paper based workflow will be replaced by digital workflow involving multiple different E-paper devices.

When deploying a document into a workflow with multiple devices there are many variables. For example, centralized systems use information technology personnel to define forms and workflows. For traditional paper-based workflows, papers or forms were created with a word processor, handed to someone, and they are told who to deliver the paper back to when a workflow step has been completed (i.e., return the form to a manager after a document has been signed). No such simple system works with electronic documents.

A further complication that arises when deploying an electronic document workflow exists in the capabilities associated with various devices. Workflow documents may not display properly due to resolution constraints, color capabilities, multimedia content support, etc. with different electronic devices. Furthermore, even if a device is capable of displaying a document, the device may not support the format of a workflow document, such as a generic postscript document formatted document, AMAZON KINDLE™ formatted document, SONY E-READER™ formatted document, or MS WORD™ extensible markup language document. Even if a device is capable of displaying a workflow document, there is no guarantee that a user will be able to perform a required workflow action on the device, such as providing a signature, selecting check boxes, etc.

SUMMARY OF THE INVENTION

A method and apparatus for a print spooler to control document and workflow transfer are described. In one embodiment, the method comprises receiving a request to print an electronic document from a print driver. The method may also comprise retrieving a workflow configuration utilizing a workflow print spooler, where the workflow print spooler provides pre-configured workflow configuration data for a corresponding workflow. In one embodiment, the method further comprises deploying the electronic document into the workflow based on the workflow configuration data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
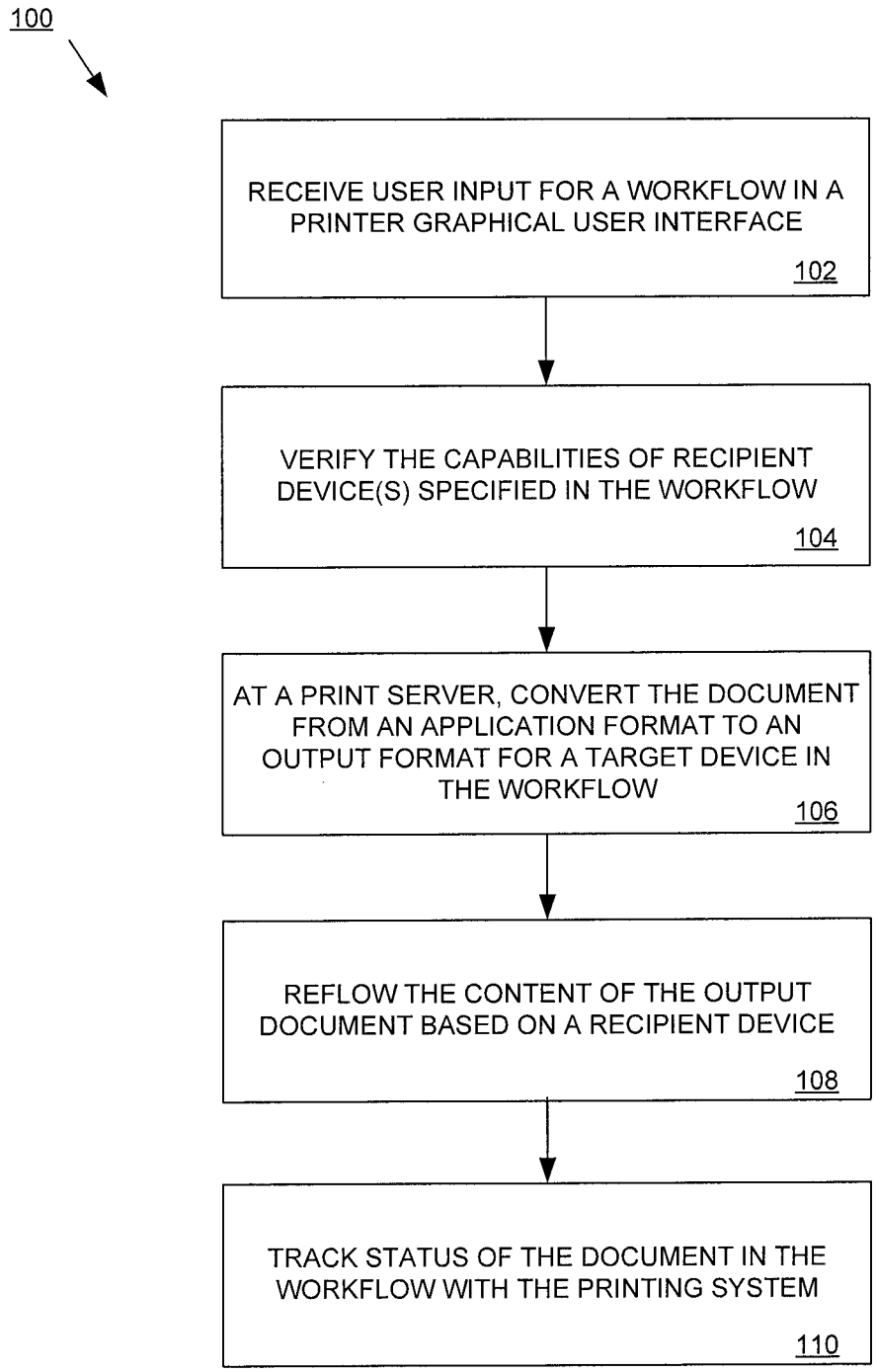
FIG. 1 is a flow diagram of one embodiment of a process for utilizing printing systems to facilitate document and workflow transfer to and from electronic devices.

A method and apparatus for a print spooler to control document and workflow transfer are described. In one embodiment, the method comprises receiving a request to print an electronic document from a print driver. The method may also comprise retrieving a workflow configuration utilizing a workflow print spooler, where the workflow print spooler provides pre-configured workflow configuration data for a corresponding workflow. In one embodiment, the method further comprises deploying the electronic document into the workflow based on the workflow configuration data.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

In one embodiment, an electronic document is deployed into a workflow utilizing printing mechanisms. In one embodiment, the workflow printing mechanism interface with a user that intends to deploy an electronic document into a workflow as a printer driver. In another embodiment, the workflow printer mechanism is a print spooler. In either embodiment, an electronic document is "printed" or deployed into a workflow and workflow information is carried either in the resulting print stream and/or in the document image itself. By enabling electronic documents to be deployed into a workflow using familiar and convenient printing mechanisms, electronic document workflows may easily and efficiently be initiated by users.

FIG. 1 is a flow diagram of one embodiment of a process 100 for utilizing printing systems to facilitate document and workflow transfer to and from electronic devices. The process is performed by processing logic that may comprise hardware (circuitry, dedicated logic, etc.), software (such as is run on a general purpose computer system or a dedicated machine), or a combination of both.

Referring to FIG. 1, the process begins by processing logic receiving user input for a workflow in a printer graphical user interface (processing block 102). In one embodiment, processing logic may interface with users that are introducing electronic documents into a workflow as either a printer driver or printer server, as discussed in greater detail below. In one embodiment, workflow information, such as destination devices, next action in a workflow, addresses for destination devices in workflow, etc. is carried in a print stream. In one embodiment, user input is received via a graphical user interface provided from a printer driver to allow a user to setup a workflow. In one embodiment, specifying a workflow includes specifying an email address where a document is to be returned to, or a more complex workflow where a user specifies which devices are involved in a workflow and what kind of action (e.g. signature capture, checkbox selection, audio annotation, etc.) is required by each device in the workflow. In one embodiment, a workflow is set up using a print driver or a print spooler that enables any application of a computing device that is capable of printing an electronic document to deploy the electronic document into a workflow.

Processing logic verifies the capabilities of recipient device specified in the workflow (processing block 104). In one embodiment, an electronic document may be sent to a number of different electronic devices, such as personal digital assistants, smart phones, tablet computers, netbooks, laptops, and personal computers. In one embodiment, a print server verifies the devices' capabilities in order to ensure that an electronic document deployed in a workflow can be rendered on each of the specified recipient devices involved in the workflow. In one embodiment, this verification includes verifying a recipient device's capabilities with respect to resolution, color/grayscale depth, and multimedia presentation capabilities. In one embodiment, the verification further determines the formats supported by each of the devices, such as whether a device can display a PDF, WORD, etc. document. In one embodiment, the print server further checks the devices' capabilities to ensure a required workflow action can be performed on the devices involved in the workflow. In one embodiment, devices that are to be involved in a workflow register with a print server or workflow sever, where the registration includes device capabilities. In another embodiment, potential recipient devices are queried by processing logic as a workflow is being setup.

Processing logic converts the document at the print server from an application format to an output format for a target device in the workflow (processing block 106). In one embodiment, the print server converts the document format from the application format to the output device format, such as converting between AZW, PDF, ePub, etc. format, to ensure a document can be rendered on a target device.

Processing logic then reflows the content of the output document based on the determined capabilities of a recipient device (processing block 108). In one embodiment, a print server reflows the content to alter the layout of an electronic document, modify content within an electronic document (e.g., converting images to grayscale, reducing image sizes, reducing color bit depth, reducing font size, increasing font size, etc.), creates a reduced size presentation of the electronic document, determines the pagination, renders fonts to bitmaps, possibly converts text to audio, etc. to ensure the layout is appropriate for a device with a limited screen size. In one embodiment, the contents of the document are reflowed as described in, for example, U.S. patent application Ser. No. 10/354,811, "Reformatting Documents Using Document Analysis Information," filed Jan. 29, 2003, published Jul. 29, 2004 (Publication No. US 2004/0146199 A1), U.S. patent application Ser. No. 10/435,300, entitled "Resolution Sensitive Layout of Document Regions," filed May 9, 2003, published Jul. 29, 2004 (Publication No. US 2004/0145593 A1), U.S. patent application Ser. No. 11/023,142, entitled "Semantic Document Smartnails," filed on Dec. 22, 2004, published Jun. 22, 2006 (Publication No. US 2006-0136491 A1), and U.S. patent application Ser. No. 11/018,231, entitled "Creating Visualizations of Documents," filed on Dec. 20, 2004, published Jun. 22, 2006 (Publication No. US 2006-0136803 A1).

Processing logic further tracks the status of the document in the workflow with the printing system (processing block 110). In one embodiment, a printing server tracks the actions and progress, of a device on a workflow document. In one embodiment, progress is tracked for each device that registers with the print server. In one embodiment, the tracking data includes whether or not a device is currently online and at which step a workflow is proceeding.

Figure 2A:
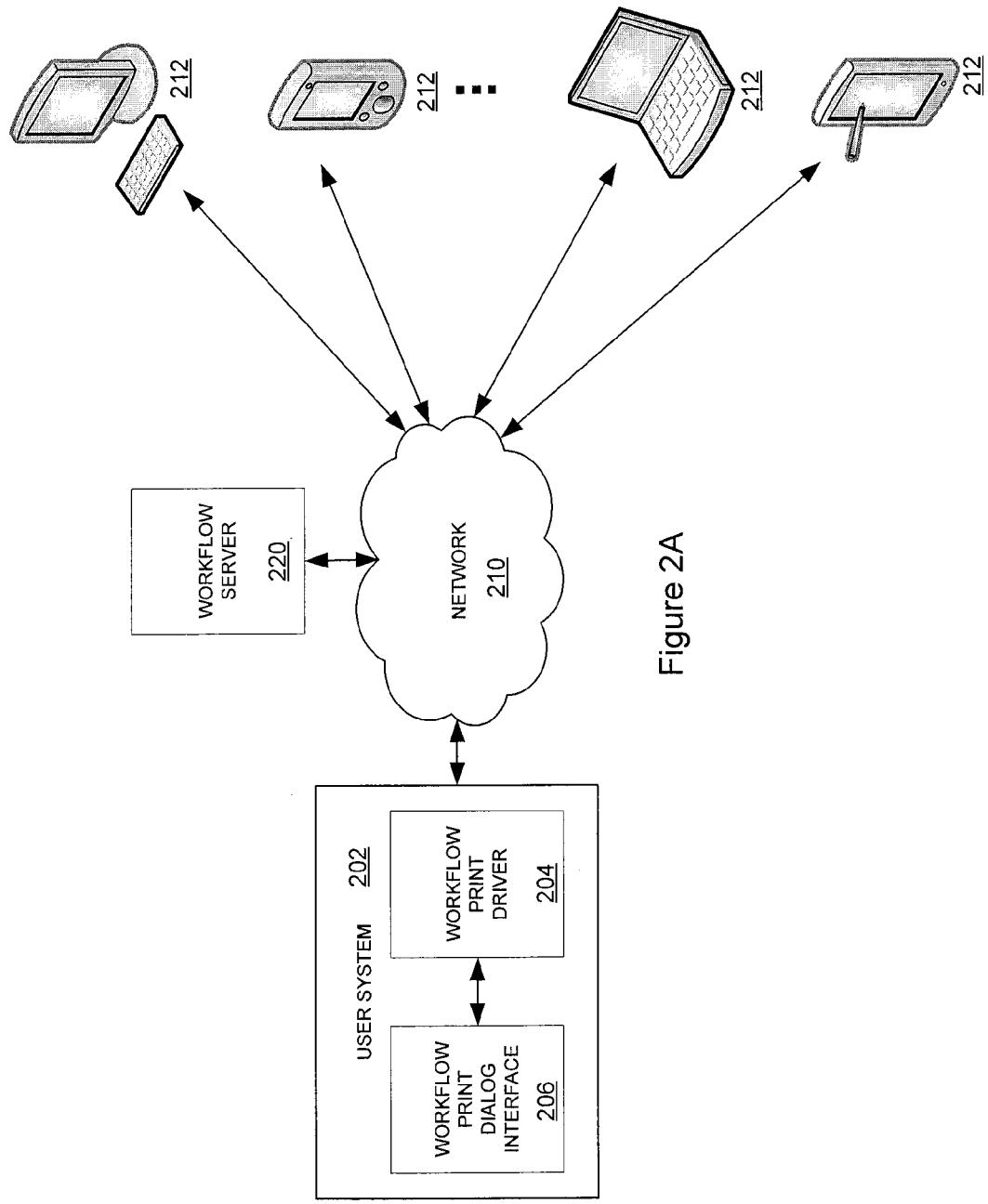
FIG. 2A illustrates one embodiment of an architecture for facilitating document and workflow transfer utilizing a print driver.

FIG. 2A illustrates one embodiment of an architecture for facilitating document and workflow transfer utilizing a print driver. In one embodiment, user system 202 and recipient devices 212 may include one or more computing devices such as server computers, desktop computers, laptop computer systems, netbooks, e-readers, tablet computers, smart phones, or other handheld computing devices. In one embodiment, user system 202 is communicably coupled with recipient devices 212, such as recipient device 1 through recipient device N, via network 210. In one embodiment, network 210 may be a wired or wireless network, such as a local access network (LAN), wide area network (e.g., the internet), or a combination of network. In one embodiment, user system 202 and recipient devices 212 communicates over network 210 via any of the standard protocols for the exchange of information.

In one embodiment, workflow print driver 204 is installed on user system 202. In one embodiment, workflow print driver 204 can be connected to any application installed on user system 202 that supports printing, and allows the selection of a device to "print" to. In one embodiment, workflow print driver 204 receives workflow setup information from a user, in response to a user selecting an electronic document to print to a workflow. As discussed herein, an electronic document may be any of a variety of documents that may be printed by user system 202, such as PDF documents, WORD documents, HTML documents, etc.

In one embodiment, by "printing" a document to a workflow, workflow print driver 204 deploys an electronic document into a workflow with user specified workflow data added to a print stream of the document, or to the document itself. In one embodiment, the document is deployed to into a workflow via a workflow server 220 or by providing an electronic document directly to recipient devices 212. In one embodiment, workflow server 220 receives printed workflow documents, sends them to recipient devices 212, maintains a log of workflow interactions, and manages a paper-like workflow for an electronic document workflow. In another embodiment, user system 202 and recipient devices 212 directly implement the actions of a workflow server (e.g., logging workflow actions, processing an electronic document and sending documents along in a workflow) via workflow logic (not shown) installed on each device.

Figure 4A:
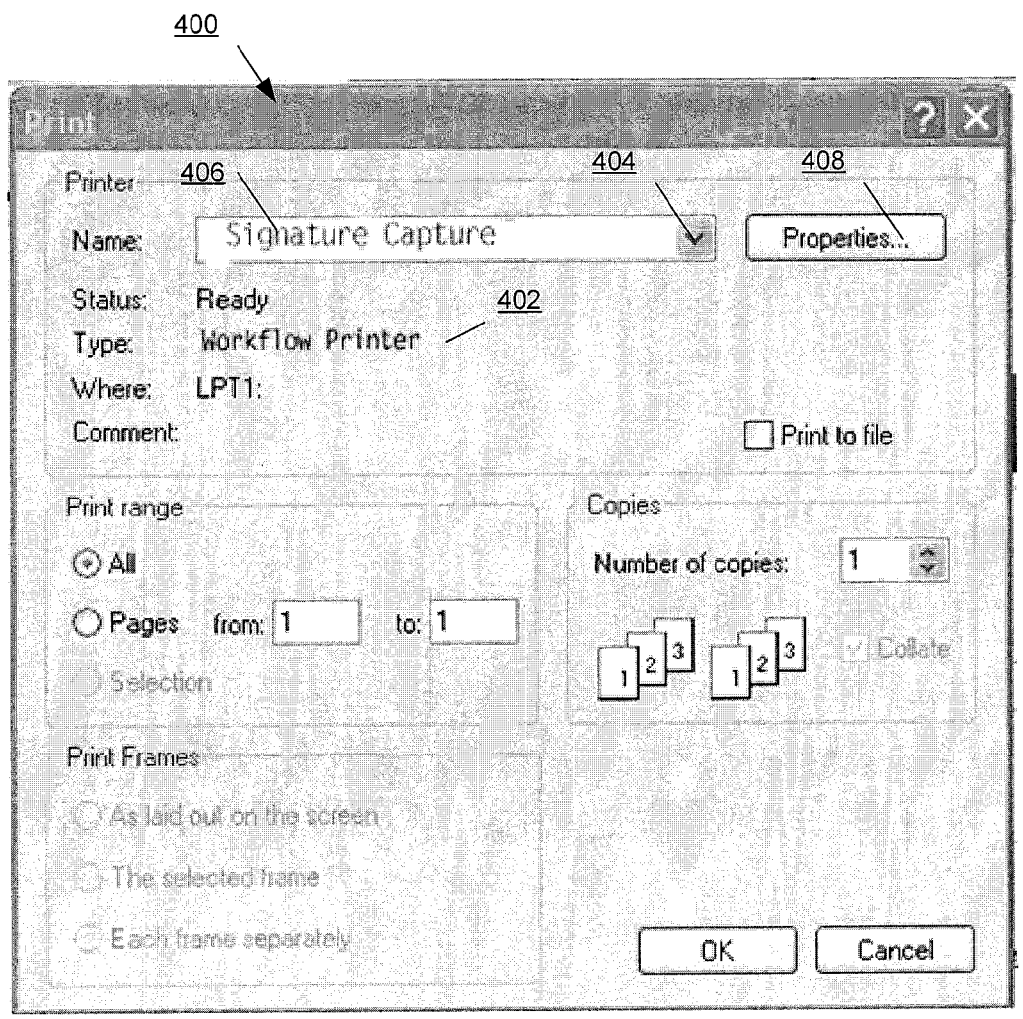
FIG. 4A illustrates one embodiment of a workflow printer dialog box rendered for a workflow.
Figure 4B:
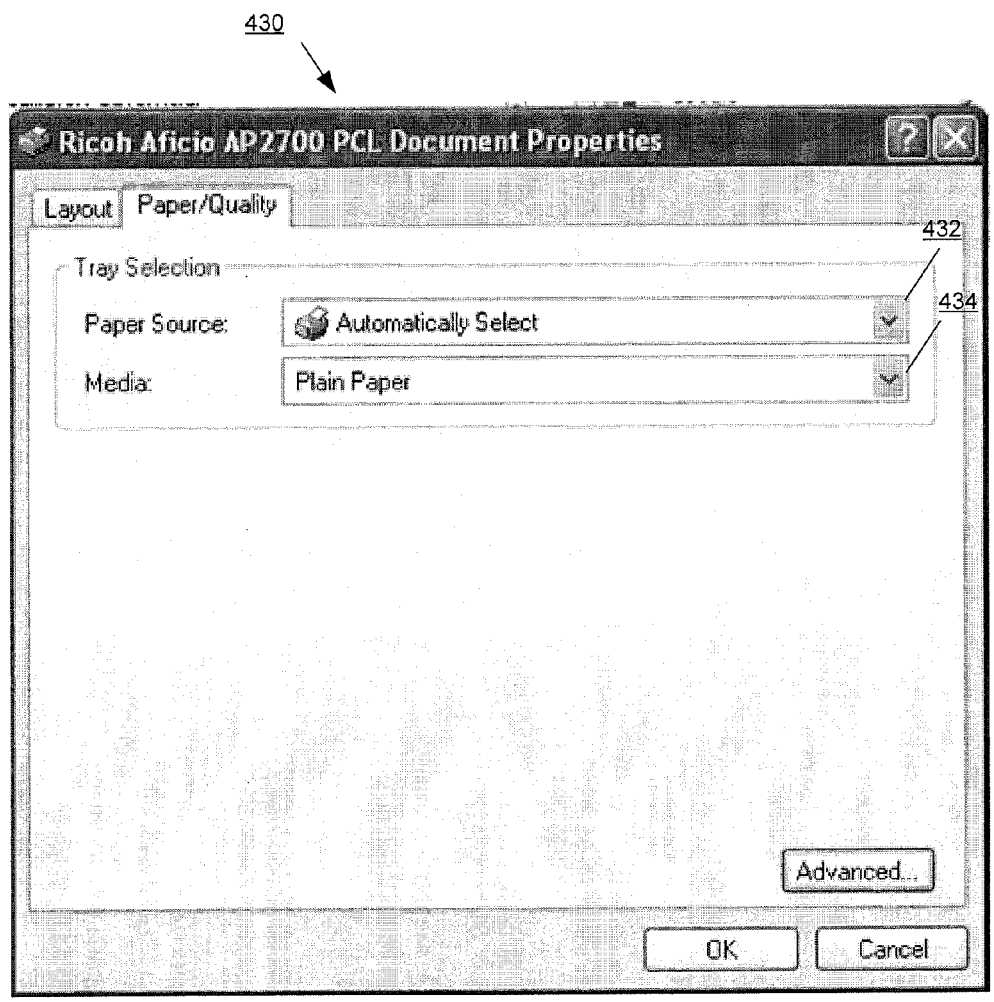
FIG. 4B illustrates one embodiment of a workflow printer dialog box rendered for a workflow.
Figure 4C:
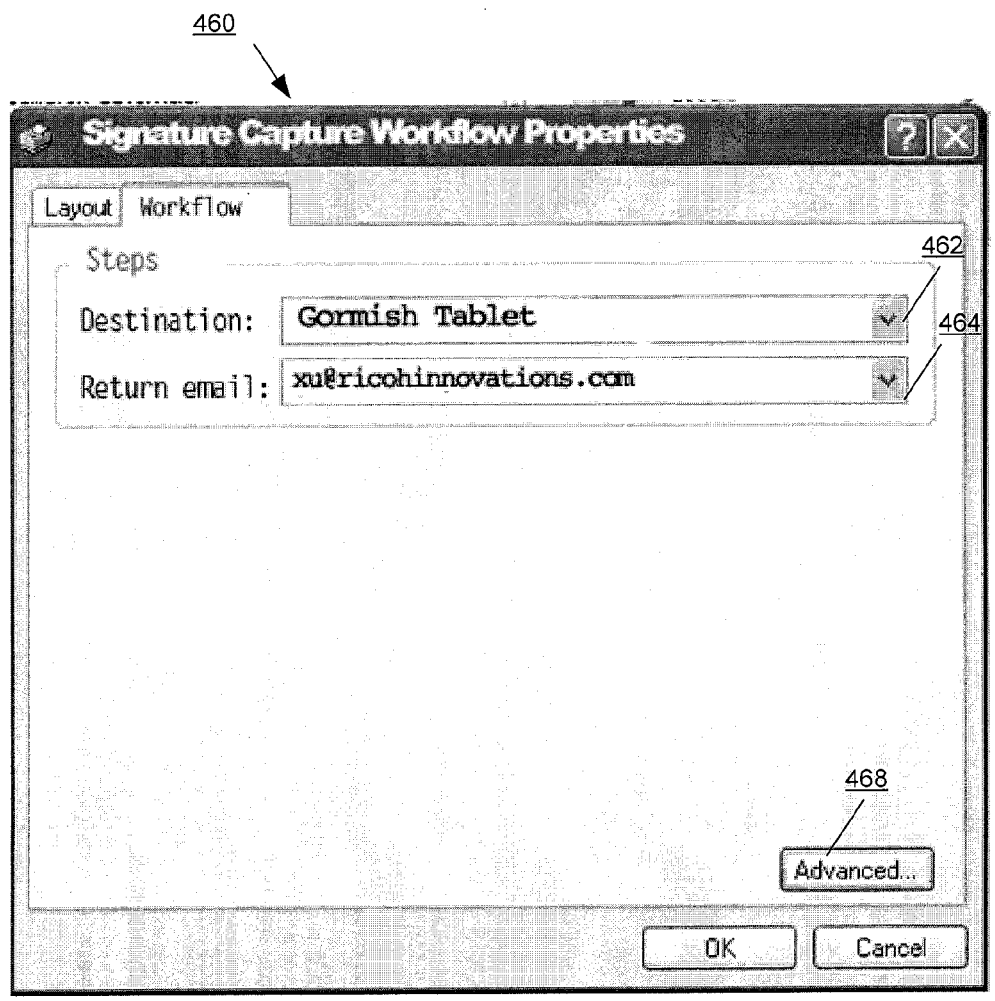
FIG. 4C illustrates one embodiment of a workflow printer dialog box rendered for a workflow.

In one embodiment, an electronic document is deployed into the workflow by embedding workflow data into the output print stream generated by the print driver 204. In one embodiment, workflow setup data received by a user, and embedded in a workflow print stream may include data, such as recipients in a workflow, steps in a workflow, actions to be performed at each step in the workflow, etc. In one embodiment, the workflow setup information is received as user input via workflow print dialog interface 206. Examples of workflow print dialog interfaces are illustrated in FIGS. 4A-C.

In one embodiment, workflow print driver 204 generates a print stream to enable a recipient device 212 specified by a workflow to render the electronic document. In addition to formatting the print stream for recipient systems 212, print driver 204 further obtains information about the next step in the workflow and includes that information in the print stream. Obtaining information might take the form of allowing a user to enter an email address, or web URL, into a dialog box of the workflow print dialog interface 206. In one embodiment, user system 202 then forwards the electronic document in a manner specified in the print stream to recipient devices 212, or to a workflow server 220, to initiate an electronic document workflow.

Figure 2B:
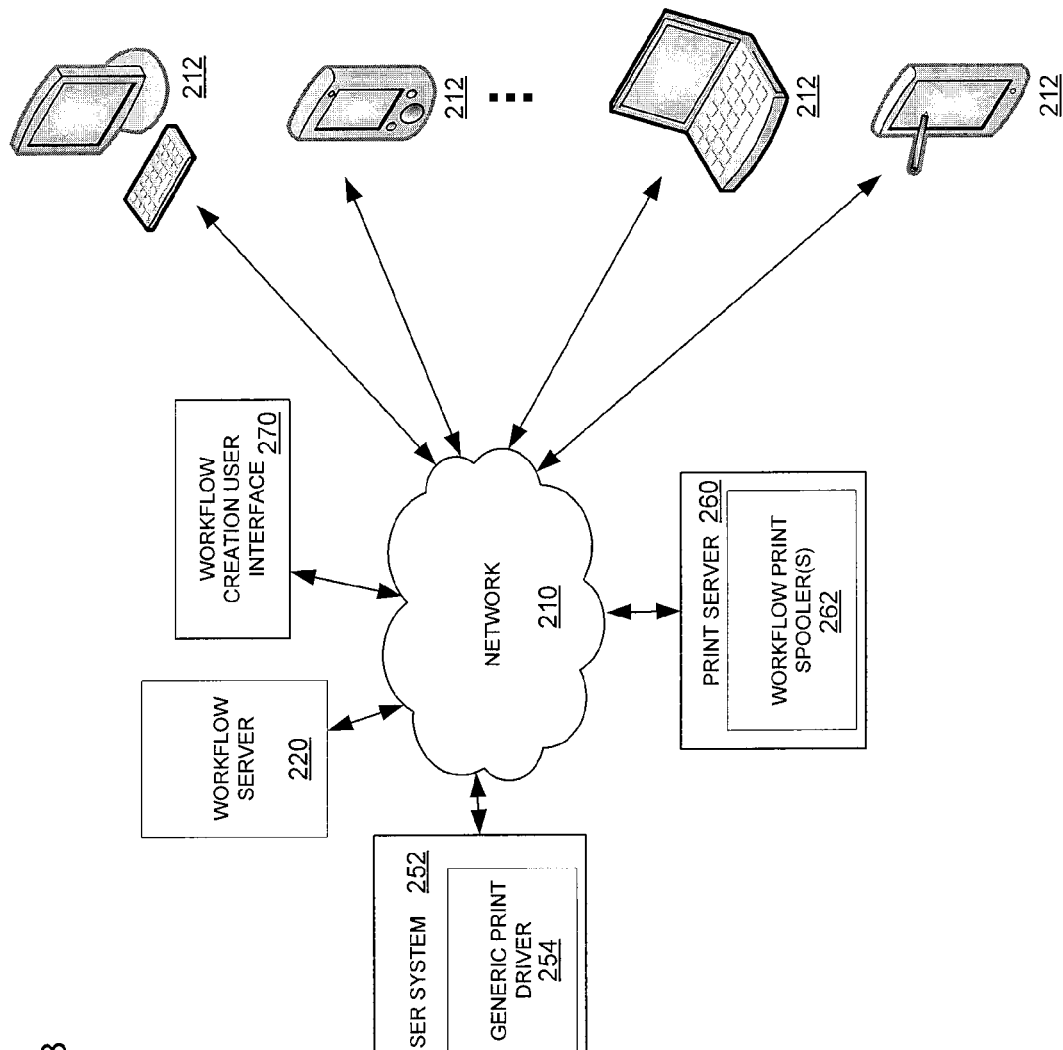
FIG. 2B illustrates one embodiment of an architecture for facilitating document and workflow transfer utilizing a print spooler.

FIG. 2B illustrates one embodiment of an architecture for facilitating document and workflow transfer utilizing a print spooler. In contrast to FIG. 2A above, an electronic document is deployed into a workflow by user system 252 without utilizing a workflow print driver. Instead, in one embodiment, user system 252 deploys a document into a workflow (i.e., by sending a document to a workflow server or to recipient devices) by utilizing a workflow print spooler, such as workflow print spoolers 262 at print server 260. In one embodiment, a generic postscript print driver 254 uses a workflow print spooler 262 that has been pre-configured for a workflow. That is, workflow print spooler 262 includes workflow information including steps of a workflow, actions to be performed at each step in a workflow, recipient systems to receive electronic documents during a workflow etc. Because there may be various workflows supported by print server 260, in one embodiment, each workflow is provided to user system 252 as a different potential workflow print spooler 262. In one embodiment, by presenting workflows as print spoolers, a user may select which workflow to "print" an electronic document into utilizing the same printer selection user interface as printing to a standard printer.

In one embodiment, the workflows associated with the workflow print spoolers 262 may be set up, or changed, with workflow creation user interface 270. In one embodiment, workflow creation user interface is a web interface accessible to user system 252, recipient systems 212, and other systems (not shown) via network 210.

In one embodiment, each workflow print spooler 262 at print server 260 is responsible for formatting a postscript print stream to the format required by a recipient system 212, as discussed above. Furthermore, workflow print spoolers 262 further embed workflow data into a "printed" electronic document or corresponding print stream, as discussed above. In one embodiment, by user system 252 sending an electronic document to recipient systems 212 in a workflow via a workflow print spooler 262, documents may be deployed into a workflow even when a recipient device 212 has been turned off or has temporarily disconnected from network 210.

Workflow Print Driver

Figure 3:
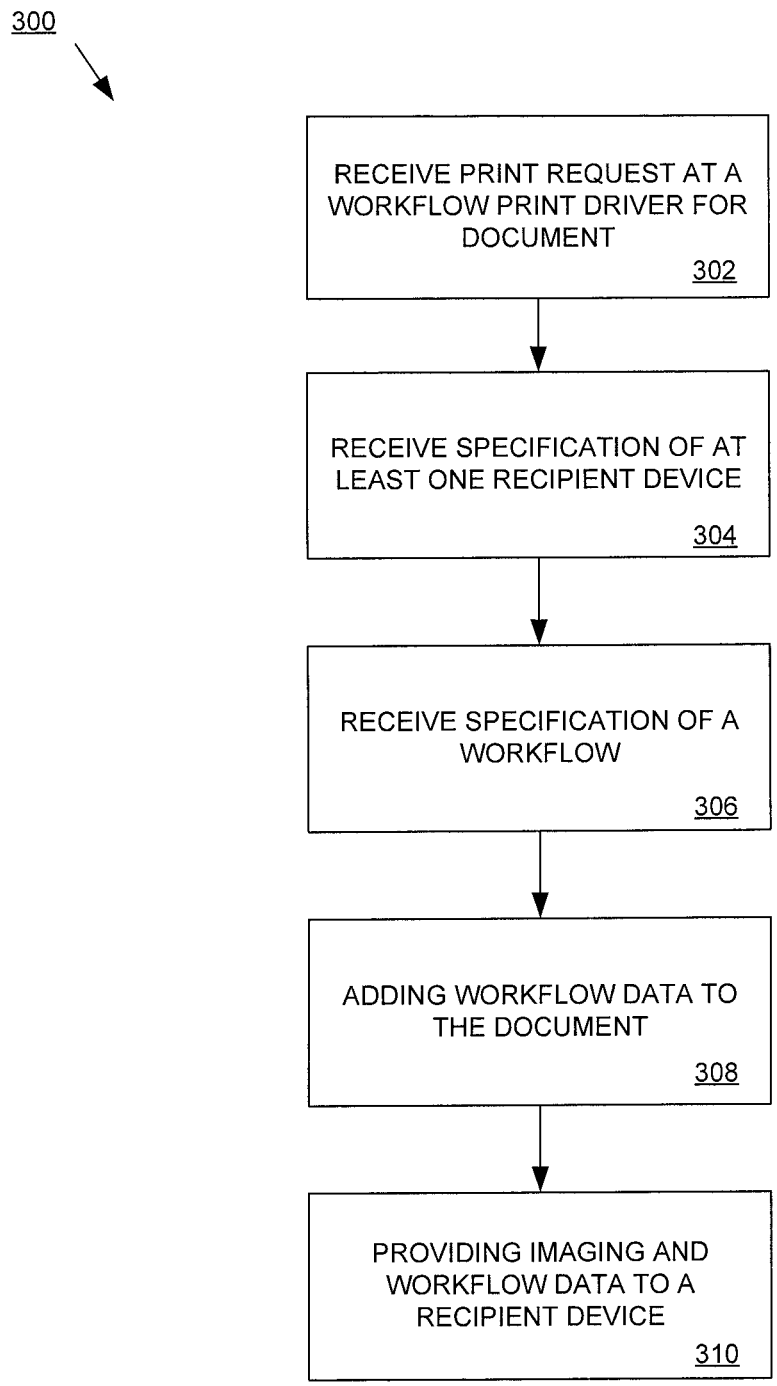
FIG. 3 is a flow diagram of one embodiment of a process for utilizing a print driver to print an electronic document into a workflow.

FIG. 3 is a flow diagram of one embodiment of a process 300 for utilizing a print driver to print an electronic document into a workflow. The process is performed by processing logic that may comprise hardware (circuitry, dedicated logic, etc.), software (such as is run on a general purpose computer system or a dedicated machine), or a combination of both.

Referring to FIG. 3, the process begins by processing logic receiving a print request at a workflow print driver specifying an electronic document (processing block 302). In one embodiment, the selection is received via a printer selection dialog box 400, such as is illustrated in FIG. 4A. In one embodiment, FIG. 4A is a standard printer dialog box except the item labeled " Name:" is a menu 404 that includes normal "physical" printers, and also "workflow" printers. As illustrated in FIG. 4A, "Signature Capture" 406 has been selected as the printer name, indicating use of a particular workflow operation. After selecting this printer, the "Type:" 402 in the dialog box is changed to "Workflow Printer" to indicate a physical printer has not been selected. This "Type" 402 could include additional information, such as the company providing an associated workflow (e.g., workflow server 220 of FIG. 2A or 2B), or the operations that would be performed by the workflow.

Processing logic receives a specification of at least one recipient device and a workflow (processing blocks 304 and 306). For a workflow printer, there is a tab for workflow properties 408. In one embodiment, selection of workflow properties 408 causes a printer dialog box that enables a workflow to be setup to be displayed, such as dialog box 460 of FIG. 4C. FIG. 4C illustrates two pieces of information in a workflow properties dialog box 462 that are useful for common workflows, destination 462 and return address 464. In the exemplary dialog box of FIG. 4C, these two items are provided to a user for selection and deployment of an electronic document into a workflow.

In one embodiment, the first item is an initial destination device 462. This could be any display and user input capture device, such as smart phones, tablet computers, netbooks, personal digital assistants, laptops, personal computers, or other user computing devices. In one embodiment, a device might be identified by a name, provided by a user or by an email address, phone number, or URL.

In one embodiment, the recipient device may be specified in a print dialog box, as illustrated in FIG. 4C. In one embodiment, destination 462 may provide an option to select users and/or devices that have registered with a workflow and/or associated print driver. In one embodiment, the destination may also receive user input specifying an address. In either embodiment, the destination may be an email address, internet protocol address, universal resource locator, etc. In one embodiment, in response to a print request, the electronic document will be deployed into a document workflow for the destination 462. As with most workflows, the document will be sent to a device specified by destination 462, the user of the destination device provides strokes e.g. a signature on the document, and then the document is returned to the return address 464.

The second item is the return address 464 the recipient device should send the workflow information to once it has been acted on by a human. In the exemplary embodiment illustrated in FIG. 4C, the device is to send an email back with the potentially modified document. Again this information could be an email address, a URL, a phone number, or the name of a workflow server.

In one embodiment, more complex workflows are possible and these could be accessed by using the "Advanced" button 468 in FIG. 4C. This might provide an area to select several steps or types of interaction for a document workflow.

Processing logic adds the workflow data to the document and provides imaging and workflow data to the recipient device (processing blocks 308 and 310). In FIG. 4C, when the "OK" button is selected, the application which initiated the print request will provide rendering instructions to a print driver, such as print driver 204 of FIG. 2A.

In one embodiment, workflow information is stored in email header lines. For example, X-Workflow-1: manager$_{13}$pad@example.com is listed as an email address for an electronic workflow document. In some cases, this syntax can be used directly for deployment in a workflow. For example, when a print driver uses HTTP to send a pdf file to a destination device, then the email header lines can be used as HTTP header lines, since the syntax is similar. In some cases it may also be useful to store workflow information in a print stream directly. For example, in postscript workflow information can be stored in a comment. Comments in postscript begin with '%' and thus workflow information can be stored on comment lines, in a manner agreed upon between a print driver and a recipient device according to a workflow system. In order to avoid reserved characters, in one embodiment, a postscript workflow comment is base64 encoded.

Because it may be better not to use a comment fields for commands, if a PDF file is being sent by a print driver for a document workflow, the information can be stored in one of the dictionaries PDF provides for storing metadata. Usually workflow information will be associated with document level dictionaries, but in one embodiment, it is possible to store page specific workflow information, for example if different pages of a multipage document should go to different destinations after completion, in the dictionary metadata.

Almost all printstream data formats contain a means to carry document metadata, or a least the ability to contain comments in which workflow metadata can be stored. In one embodiment, more complex workflows could be described with more formal workflow languages. Formal languages such as XPDL, UML, BPEL, XLANG, WSFL, BPML, WSCI are workflow or modeling languages that can be stored in metadata and shipped with a print stream.

In one embodiment, if a user would like to change a printer, they can select the "Properties" button 408 to the right of the printer name in FIG. 4A. With a physical printer this would result in a dialog box 430 similar to that shown in FIG. 4B, which includes tabs for layout and Paper/Quality. For a workflow print driver, some tabs like "layout" might be the same as for a physical printer. Other tabs like "paper/Quality" are replaced with a "display qualities" tab (not shown), or such a tab might not be necessary.

Workflow Print Spooler

Figure 5:
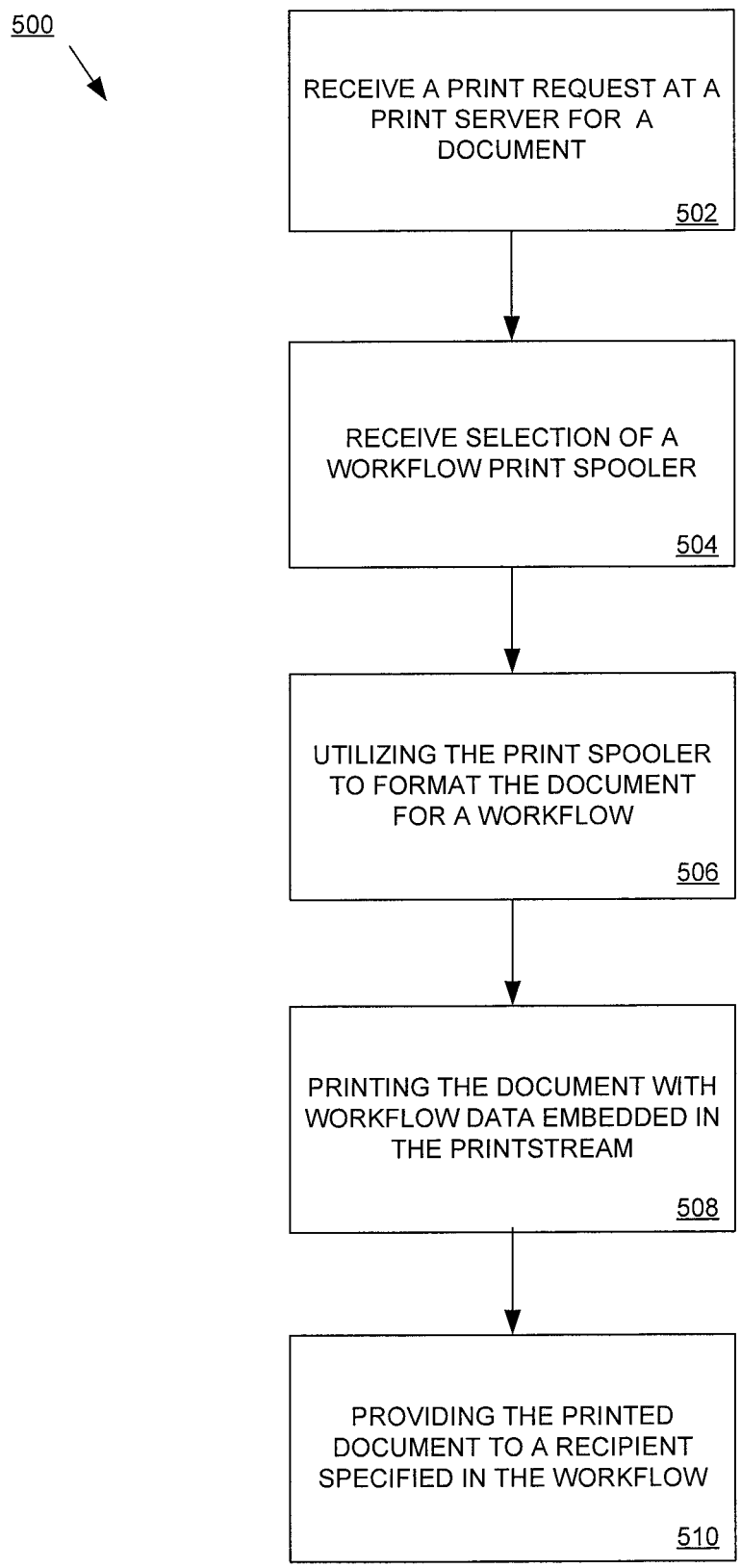
FIG. 5 is a flow diagram of one embodiment of a process for utilizing a print spooler to deploy an electronic document into a workflow.

FIG. 5 is a flow diagram of one embodiment of a process 500 for utilizing a print spooler to deploy an electronic document into a workflow. The process is performed by processing logic that may comprise hardware (circuitry, dedicated logic, etc.), software (such as is run on a general purpose computer system or a dedicated machine), or a combination of both.

Referring to FIG. 5, the process begins by processing logic receiving a print request at a print server for an electronic document (processing block 502). In one embodiment, the print request specifies a document that is to be deployed into a workflow using a generic postscript printer driver. In one embodiment, the document may be any of a PDF, WORD, HTML, etc. document.

Processing logic then receives selection of a workflow print spooler (processing block 504). In one embodiment, the workflow print spooler is preconfigured for a specific workflow and enables a user to select the properties associated with the pre-configured workflow, devices to send an electronic document to in a workflow, next steps or a workflow, etc. In one embodiment, selection of a workflow spooler is received just as a normal printer selection. In one embodiment, the selection of the workflow print spooler specifies one of a plurality of different workflow print spoolers, where each different workflow print spooler enables deploying an electronic document into a different workflow.

Processing logic utilizes the print spooler to format the document for a selected workflow and prints the document with the workflow data embedded in the document and/or print stream (processing blocks 506 and 508). Processing logic provides the print stream, i.e. the workflow document, to a recipient specified in the workflow (processing block 510). In one embodiment, processing logic configures an output document/print stream as discussed above in FIG. 3. However, processing logic of FIG. 5 utilizes a pre-configured workflow and does not utilize user-selected workflow options. In one embodiment, workflow options are set when a workflow is created using user interface 270.

Figure 6:
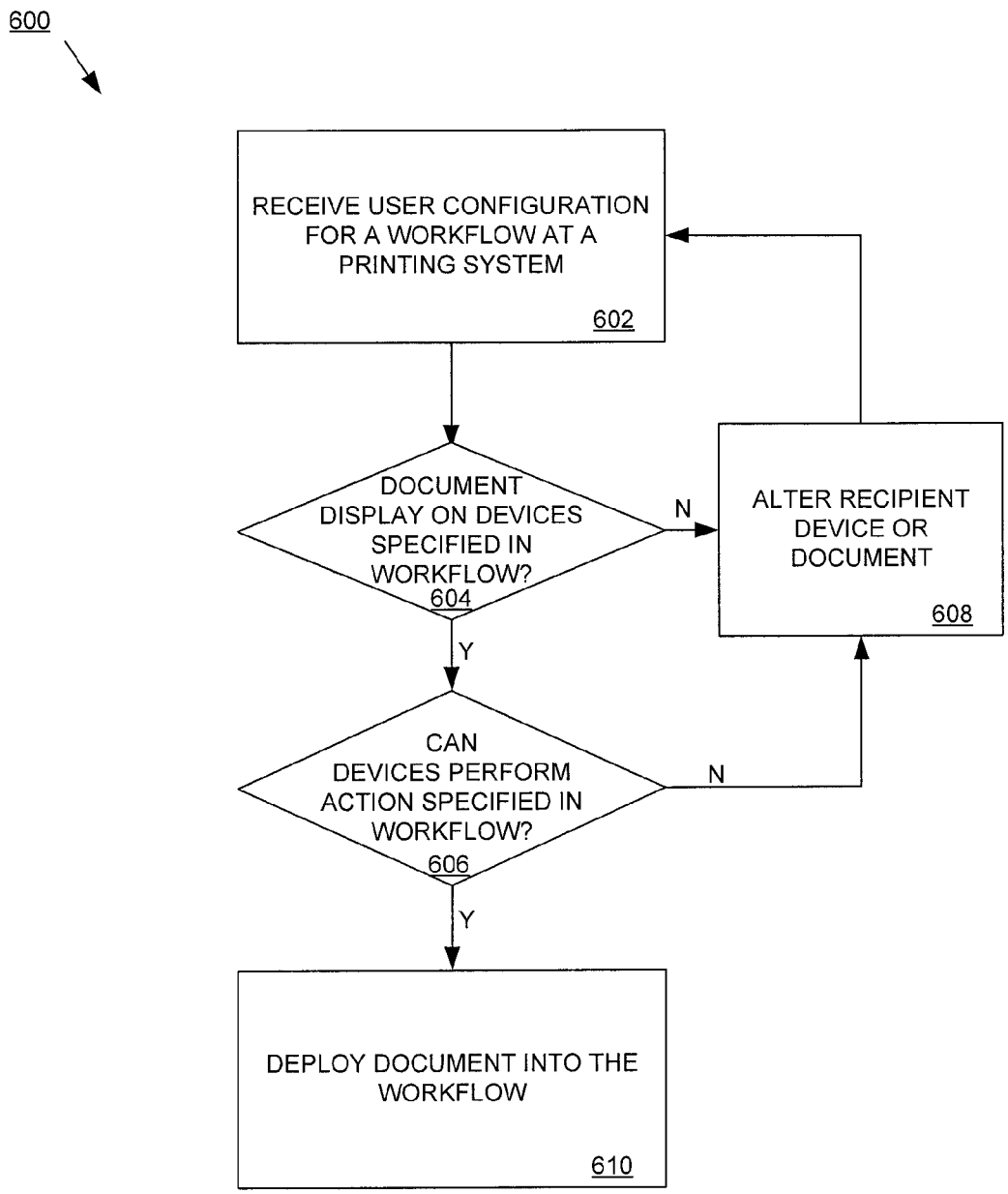
FIG. 6 is a flow diagram of one embodiment of a process for determining device capabilities for an electronic document workflow.

FIG. 6 is a flow diagram of one embodiment of a process 600 for determining device capabilities for an electronic document workflow. The process is performed by processing logic that may comprise hardware (circuitry, dedicated logic, etc.), software (such as is run on a general purpose computer system or a dedicated machine), or a combination of both.

Referring to FIG. 6, the process begins by processing logic receiving user configuration of a workflow at a printing system (processing block 602). In one embodiment, the workflow is received by a workflow print driver, such as print driver 204 of FIG. 2A or workflow print spooler 202 of FIG. 2B.

Processing logic determines if a document that is to be deployed into a workflow, where the workflow specifies destination devices, can be displayed on the destination devices (processing block 604). Processing logic further determines if the recipient devices are capable of performing the actions as specified by a workflow (processing logic 606). In one embodiment, recipient devices pre-register with a workflow server or printer driver in order to make themselves available for participating in an electronic document workflow. In one embodiment, the recipient devices provide their capabilities during this registration process, which processing logic therefore uses to determine destination or recipient device capabilities.

When either a document cannot be displayed, or a device cannot perform a specified workflow action, processing logic displays a dialog box, via the printing system, warning a user to change a recipient device, alter a document, or change the worklfow (processing block 608). Processing logic then returns to processing block 602 to receive a new configuration of a workflow, list of recipient device, workflow actions to be performed, etc.

However, when a document can be displayed, and a recipient device can perform the specified workflow action, processing logic deploys the document into the workflow (processing block 610).

Figure 7:
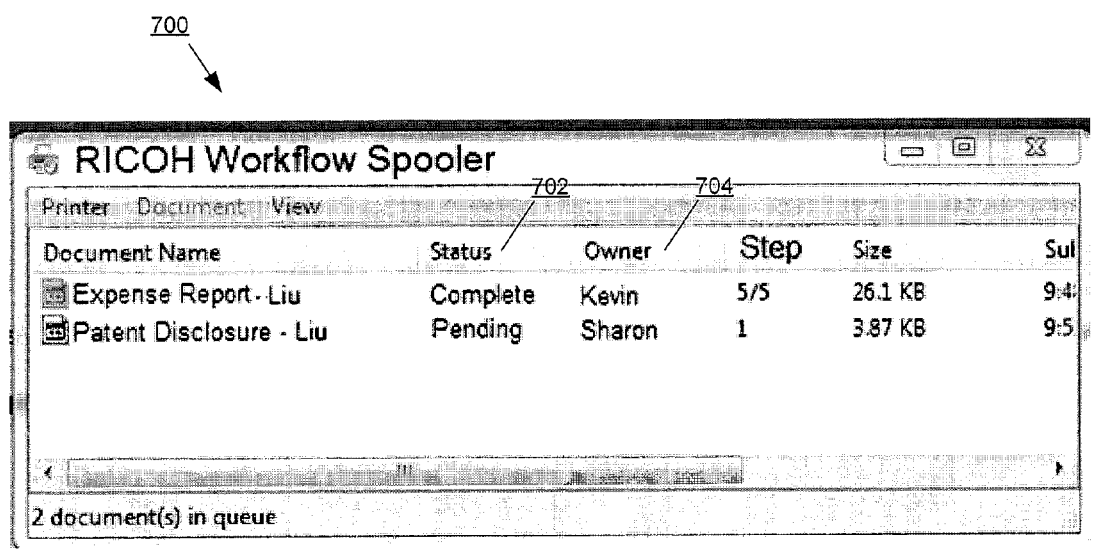
FIG. 7 illustrates a graphical user interface for determining the status of an electronic document within a workflow.

FIG. 7 illustrates a graphical user interface 700 for determining the status of an electronic document within a workflow. In one embodiment, the graphical user interface utilizes a printer progress graphical user interface to display workflow status 702 and a user/device associated with a workflow step 704. In one embodiment, workflow status 702 is populated when a print driver, such as workflow print driver 204 of FIG. 2, queries recipient devices for status in a workflow. Just as a standard print driver may query a printer for progress of a print job (i.e., "Printing page 42 of 100"), a workflow print driver queries the devices in workflow. In one embodiment, the progress 702, such as completed, pending, etc., is displayed in the graphical user interface 700.

Figure 8:
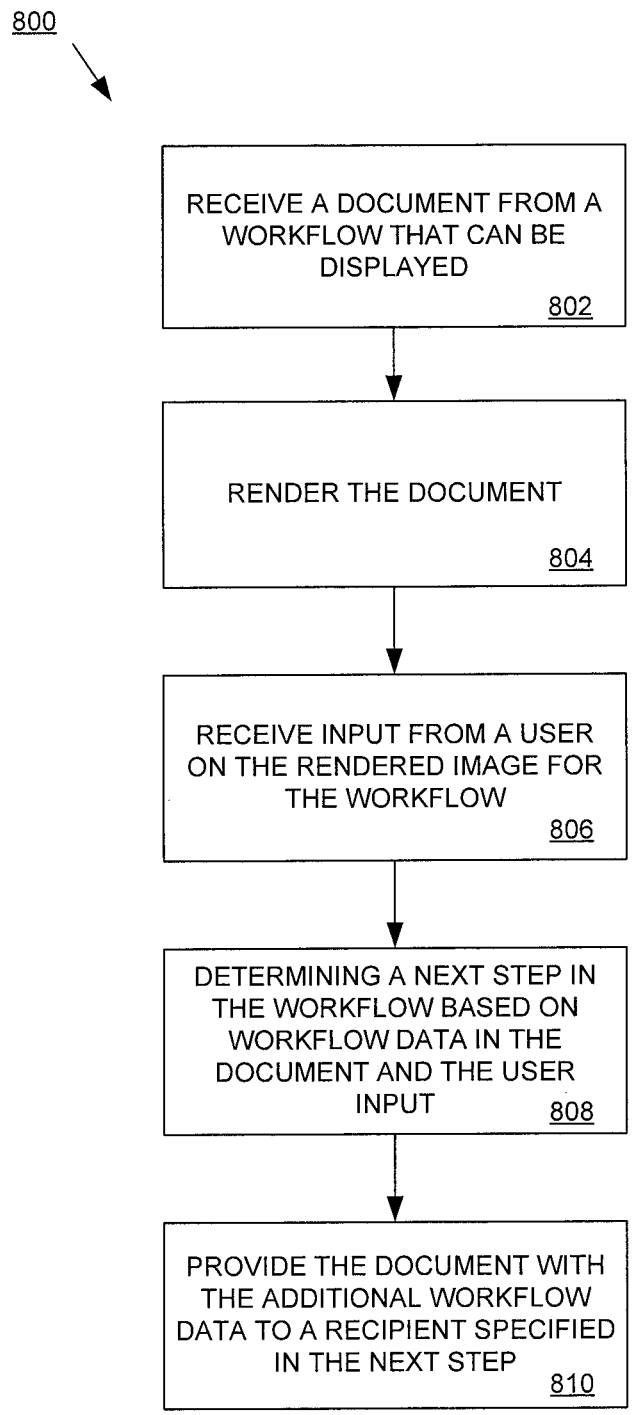
FIG. 8 is a flow diagram of one embodiment of a process for a recipient device processing workflow document received from a printing system.

FIG. 8 is a flow diagram of one embodiment of a process 800 for a recipient device processing workflow document received from a printing system. The process is performed by processing logic that may comprise hardware (circuitry, dedicated logic, etc.), software (such as is run on a general purpose computer system or a dedicated machine), or a combination of both.

Referring to FIG. 8, the process begins by processing logic receiving and rendering an electronic document from a workflow, where the document can be displayed (processing blocks 802 and 804). In one embodiment, the document is an image that has been printed to a recipient device from a workflow printing system, such as is illustrated in FIG. 2A or FIG. 2B.

Processing logic receives input from a user on the rendered image for the workflow (processing block 806).

Processing logic then determines a next step in the workflow based on workflow data in the document, as well as the user input (processing block 808). In one embodiment, the workflow data is embedded as metadata within the document. In another embodiment, the workflow data is embedded in comments of a print stream that was used to render the document.

Processing logic then provides the document with the additional workflow data to a recipient specified in the next step (processing block 810).

An Example of a Computer System

Figure 9:
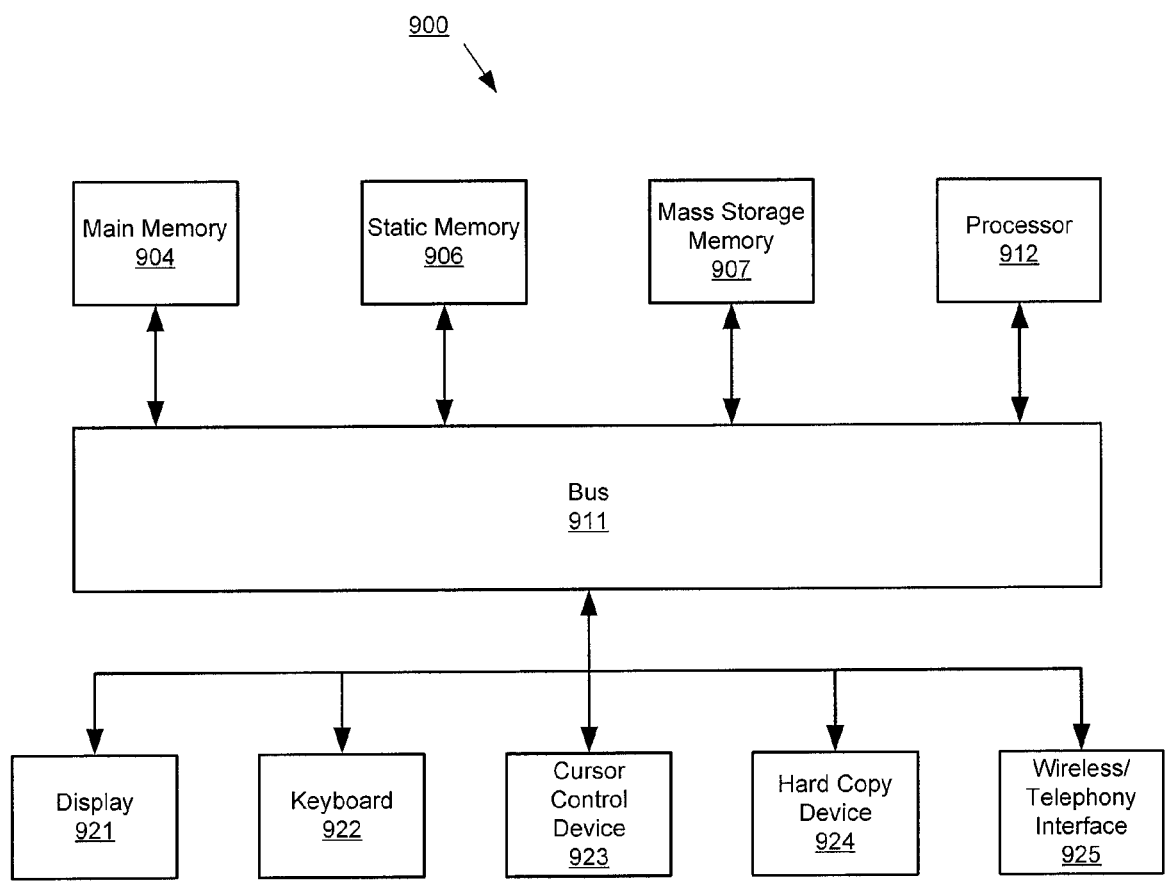
FIG. 9 is a block diagram of a computer system that may perform one or more of the operations described herein.

FIG. 9 is a block diagram of a computer system that may perform one or more of the operations described herein. Referring to FIG. 9, computer system 900 may comprise an exemplary client or a server computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, etc.

System 900 further comprises a random access memory (RAM), or other dynamic storage device 104 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for printing instructions, data, or other information on a medium such as paper, film, or similar types of media. Furthermore, a sound recording and playback device, such as a speaker and/or microphone may optionally be coupled to bus 911 for audio interfacing with computer system 900. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method comprising:
   receiving a request to print an electronic document from a print driver;
   retrieving a workflow configuration utilizing a workflow print spooler, the workflow print spooler provides pre-configured workflow configuration data for a corresponding workflow; and
   deploying the electronic document into the workflow based on the workflow configuration data in response to the request to print the electronic document, wherein deploying the electronic document into the workflow further comprises receiving a print stream for the electronic document generated by the print driver, wherein the print spooler embeds the pre-configured workflow configuration data within the print stream.

2. The method of claim 1, wherein the workflow print spooler is one of a plurality of different workflow print spoolers, each of the different workflow print spoolers provides workflow configuration data for a different workflow.

3. The method of claim 1, wherein the workflow configuration data is embedded as comments within the print stream.

4. The method of claim 1, wherein the pre-configured workflow configuration data includes one or more of a recipient device to receive the electronic document during a course of the workflow and steps to be carried out by recipient devices within the workflow.

5. The method of claim 1, further comprising:
   determining capabilities of recipient devices specified by the pre-configured workflow configuration data;
   reformatting the electronic document based on the determined capabilities of the recipient devices; and
   deploying a reformatted version of the electronic document into the workflow based on the pre-configured workflow configuration data.

6. The method of claim 5, wherein reformatting further comprises:
   converting a format of the electronic document from a first file type to a second file type, the second type supported by a recipient device.

7. The method of claim 5, wherein reformatting further comprises:
   altering a layout of content of the electronic document from a first layout to a second layout, the second layout appropriate for a recipient device with limited display capabilities.

8. The method of claim 5, wherein reformatting further comprises:
   modifying content within the electronic document, the modified content appropriate for a recipient device with limited display capabilities.

9. The method of claim 8, wherein the content is modified by at least one of resizing an image within the electronic document and color conversion of an image within the electronic document.

10. The method of claim 1, further comprising:
    determining a status of the electronic document within the workflow with the workflow print spooler; and
    displaying the status in a print dialog graphical user interface.

11. The method of claim 1, wherein the workflow is a signature capture workflow.

12. A non-transitory computer readable storage medium that provides instructions, which when executed on a processing system, cause said processing system to perform a method comprising:
    receiving a request to print an electronic document from a print driver;
    retrieving a workflow configuration utilizing a workflow print spooler, the workflow print spooler provides pre-configured workflow configuration data for a corresponding workflow; and
    deploying the electronic document into the workflow based on the workflow configuration data in response to the request to print the electronic document, wherein deploying the electronic document into the workflow further comprises receiving a print stream for the electronic document generated by the print driver, wherein the print spooler embeds the pre-configured workflow configuration data within the print stream.

13. The non-transitory computer readable storage medium of claim 12, wherein the workflow print spooler is one of a plurality of different workflow print spoolers, each of the different workflow print spoolers provides workflow configuration data for a different workflow.

14. The non-transitory computer readable storage medium of claim 12, wherein the workflow configuration data is embedded as comments within the print stream.

15. The non-transitory computer readable storage medium of claim 12, wherein the pre-configured workflow configuration data includes one or more of a recipient device to receive the electronic document during a course of the workflow and steps to be carried out by recipient devices within the workflow.

16. The non-transitory computer readable storage medium of claim 12, further comprising:
    determining capabilities of recipient devices specified by the pre-configured workflow configuration data;
    reformatting the electronic document based on the determined capabilities of the recipient devices by
        converting a format of the electronic document from a first file type to a second file type, the second type supported by a recipient device,
        altering a layout of content of the electronic document from a first layout to a second layout, the second layout appropriate for limited display capabilities of a recipient device, and
        modifying content within the electronic document, the modified content appropriate for the recipient device; and deploying a reformatted version of the electronic document into the workflow based on the pre-configured workflow configuration data.

17. The non-transitory The computer readable storage medium of claim 12, further comprising:
    determining a status of the electronic document within the workflow with the workflow print spooler; and
    displaying the status in a print dialog graphical user interface.

18. A system, comprising:
    a memory to store an electronic document; and
    a processor coupled with the memory to
        receive a request to print an electronic document from a print driver;
        retrieve a workflow configuration utilizing a workflow print spooler, the workflow print spooler provides pre-configured workflow configuration data for a corresponding workflow; and
        deploy the electronic document into the workflow based on the workflow configuration data in response to the request to print the electronic document, wherein deployment of the electronic document into the workflow further comprises the processor to receive a print stream for the electronic document generated by the print driver, wherein the print spooler embeds the pre-configured workflow configuration data within the print stream.

19. The system of claim 18, wherein the workflow print spooler is one of a plurality of different workflow print spoolers, each of the different workflow print spoolers provides workflow configuration data for a different workflow.

20. The system of claim 18, wherein the pre-configured workflow configuration data includes one or more of a recipient device to receive the electronic document during a course of the workflow and steps to be carried out by recipient devices within the workflow.

* * * * *